US008424300B1

(12) United States Patent
Navarro

(10) Patent No.: US 8,424,300 B1
(45) Date of Patent: Apr. 23, 2013

(54) SEA ELECTRICITY ENERGY PRODUCTION UNIT

(76) Inventor: Richard M. Navarro, Corpus Christi, TX (US)

( * ) Notice: Subject to any disclaimer, the term of this patent is extended or adjusted under 35 U.S.C. 154(b) by 737 days.

(21) Appl. No.: 12/690,885

(22) Filed: Jan. 20, 2010

Related U.S. Application Data

(60) Provisional application No. 61/145,788, filed on Jan. 20, 2009.

(51) Int. Cl.
*F16D 31/02* (2006.01)
*F03B 13/14* (2006.01)
*F04B 17/00* (2006.01)

(52) U.S. Cl.
USPC .............................. 60/398; 290/53; 417/331

(58) Field of Classification Search .................. 60/398; 290/42, 43, 53, 54; 417/330, 331, 332, 333, 417/337
See application file for complete search history.

(56) References Cited

U.S. PATENT DOCUMENTS

| | | | |
|---|---|---|---|
| 3,353,787 A | 11/1967 | Semo | |
| 4,092,828 A * | 6/1978 | Garza | ............................. 60/398 |
| 4,266,143 A | 5/1981 | Ng | |
| 4,345,434 A | 8/1982 | Nedyalkov | |
| 4,454,429 A | 6/1984 | Buonome | |
| 4,462,211 A | 7/1984 | Linderfelt | |
| 5,986,349 A | 11/1999 | Eberle | |
| 6,451,204 B1 | 9/2002 | Anderson | |
| 6,647,716 B2 | 11/2003 | Boyd | |
| 6,812,588 B1 * | 11/2004 | Zadig | .............................. 290/53 |
| 7,188,471 B2 * | 3/2007 | Walters | ........................... 60/398 |
| 7,952,218 B2 * | 5/2011 | Welch et al. | ..................... 290/53 |
| 2007/0164568 A1 | 7/2007 | Greenspan et al. | |

OTHER PUBLICATIONS

"Maui ocean wave-energy project planned," Pacific Business News (Honolulu), Feb. 4, 2008, 1 page.

* cited by examiner

*Primary Examiner* — Michael Leslie
(74) *Attorney, Agent, or Firm* — Mark W Handley

(57) ABSTRACT

Sea Electrical Energy Production (SEEP") unit (12) is disclosed for using the rise and fall of ocean waves to drive a hydraulic pump (18) which draws water through a turbine (14) to drive an electric generator (16). The crests and troughs of the ocean waves drive the hydraulic pump (18) which both draws suction on and pressurizes a reservoir (50) that receives water discharged from the turbine (14). A suction stroke of the hydraulic pump (18) draws water from the ocean through the turbine (14), through a first one-way valve (54) and into a pressure reservoir (50). A pressure stroke of the hydraulic pump (18) pushes water from the pressure reservoir (50), through the second one-way valve (56) and back into the sea. The turbine (14) is preferably directly connected to the electric generator (16) by gears to increases the rate of rotation of applied to the electric generator (16) when low pressure heads are applied across the turbine (12).

19 Claims, 3 Drawing Sheets

SEA ELECTRICITY ENERGY PRODUCTION UNIT

CROSS-REFERENCE TO RELATED APPLICATION

The present application claims priority as a continuation-in-part application of U.S. Provisional Patent Application Ser. No. 61/145,788, filed Jan. 20, 2009, entitled "SEA ELECTRICITY ENERGY PRODUCTION," and invented by Richard Marvin Navarro.

TECHNICAL FIELD OF THE INVENTION

The present invention relates in general to a method and an apparatus for using ocean wave energy to generate electricity, and in particular to a method and apparatus for using wave energy to draw water through a water turbine which powers an electric generator.

BACKGROUND OF THE INVENTION

Although flowing water has been used for centuries to do work, the power of sea waves is a constant source of non-polluting energy that has not been commercially tapped in a significant way to produce electricity. Historically, the successful application of water power used flowing water to turn a water wheel or a turbine. This is true for very old devices used to grind grain as well as for modern hydroelectric generator plants using water flow from a river or a dam. A plethora of devices have been developed in an attempt to harness the energy of the sea with very little commercial success. One such example is the Wave Energy Project off the coast of the island of Maui, Hi. which uses the crests and troughs of sea waves to force air through a turbine. Other devices have used various types of underwater propellers to catch the energy of underwater waves to drive electric generators. Some have used pressure provided by the force of waves to drive motors.

SUMMARY OF THE INVENTION

The present invention is directed toward a Sea Electrical Energy Production unit ("SEEP unit") which uses the rise and fall of ocean waves to drive a hydraulic pump which draws sea water through a water turbine to drive an electric generator. Water is discharged from the turbine and passes into a pressure reservoir. An inlet one-way valve and an outlet one-way valve control flow into the pressure reservoir from the turbine and out of the pressure reservoir into the sea, respectively. The crests and troughs of the ocean waves drive the hydraulic pump which both draws suction on and pressurizes the reservoir. A suction stroke of the hydraulic pump draws water from the sea through the turbine, through a first one-way valve and into the pressure reservoir. A pressure stroke of the hydraulic pump pushes water from the reservoir, through the second one-way valve and back into the sea. The turbine is preferably connected to the electric generator by a gear system to increase the rate of rotation applied to a drive shaft of the electric generator when low pressure heads are applied across the turbine. A SEEP unit made according to the present invention is preferably configured with multiple hydraulic pumps that together to provide a constant flow of water through the turbine, which can be relied on to produce a given amount of power. In other embodiments of the present invention, a single hydraulic pump may be used which has a pressure reservoir which is significantly larger than one of the multiple hydraulic pumps. SEEP units may be built to standardized specifications to allow for mass production of modular units of a specific electric power output. Preferably, most of the components of SEEP units made according to the present invention are located below ground along a shoreline, or below the water level, so that ocean waves may be used to generate power without disrupting the aesthetics of the local environment and posing minimal hazards to marine life. SEEP units made according to the present invention may also be used near large bodies of water other than oceans, such as one of the Great Lakes of the USA or similar lakes around the world.

DESCRIPTION OF THE DRAWINGS

For a more complete understanding of the present invention and the advantages thereof, reference is now made to the following description taken in conjunction with the accompanying Drawings in which

FIG. 1 is a schematic diagram depicting a side elevation view of the SEEP unit;

FIG. 2 is a schematic diagram depicting a side elevation view of a float and an associated float tube for driving a hydraulic pump of the SEEP unit;

FIG. 3 is a schematic diagram depicting a side elevation view of a water turbine and generator of the SEEP unit; and FIG. 4 is a schematic diagram depicting a side elevation view showing operation of the float and float tube for drawing water through the SEEP unit.

DETAILED DESCRIPTION OF THE INVENTION

Figure 1:
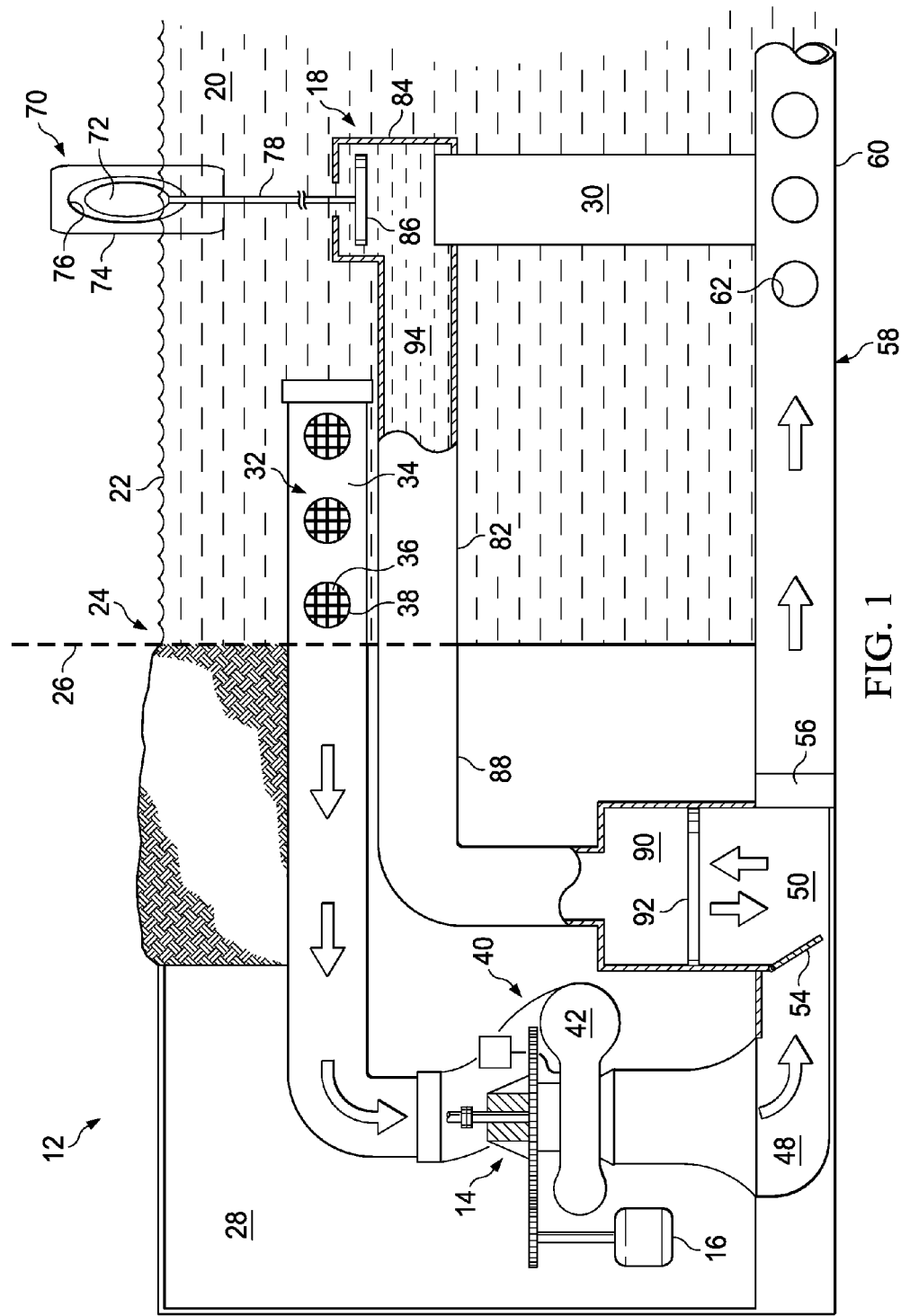
FIGS. 1 through 4 show various aspects for a Sea Electricity Energy Production unit ("SEEP unit") made according to the present invention, as set forth below.

FIG. 1 is a schematic diagram depicting a side elevation view of a SEEP unit 12 made according to the present invention. The SEEP unit 12 has a water turbine 14 which drives an electric generator 16 to produce electricity. The SEEP unit 12 also includes a hydraulic pump 18 which is driven by waves 22 to draw sea water 20 into the SEEP 12 and through the turbine 14. Although one hydraulic pump 18 is shown in FIG. 1 for simplifying the diagram, preferably a plurality of hydraulic pumps are included in the SEEP 12 to provide a continuous flow of sea water 20 through the turbine 14. In some embodiments, only a single hydraulic pump 18 may be used which is significantly larger than one of the multiple hydraulic pumps. The SEEP 12 is also preferably located along a shoreline 26 and disposed beneath sea level 24, with the turbine 14 and the electric generator 16 located within a maintenance area 28 disposed inside of the shoreline 26. A water inlet pipe 32 extends outward from the maintenance area 28 to provide a penstock for the water turbine 14. The hydraulic pump 18 and a discharge pipe 58 also extend outward of the maintenance area 28 and the shoreline 26. A support structure 30 retains the hydraulic pump and the discharge 58 in position.

Figure 3:
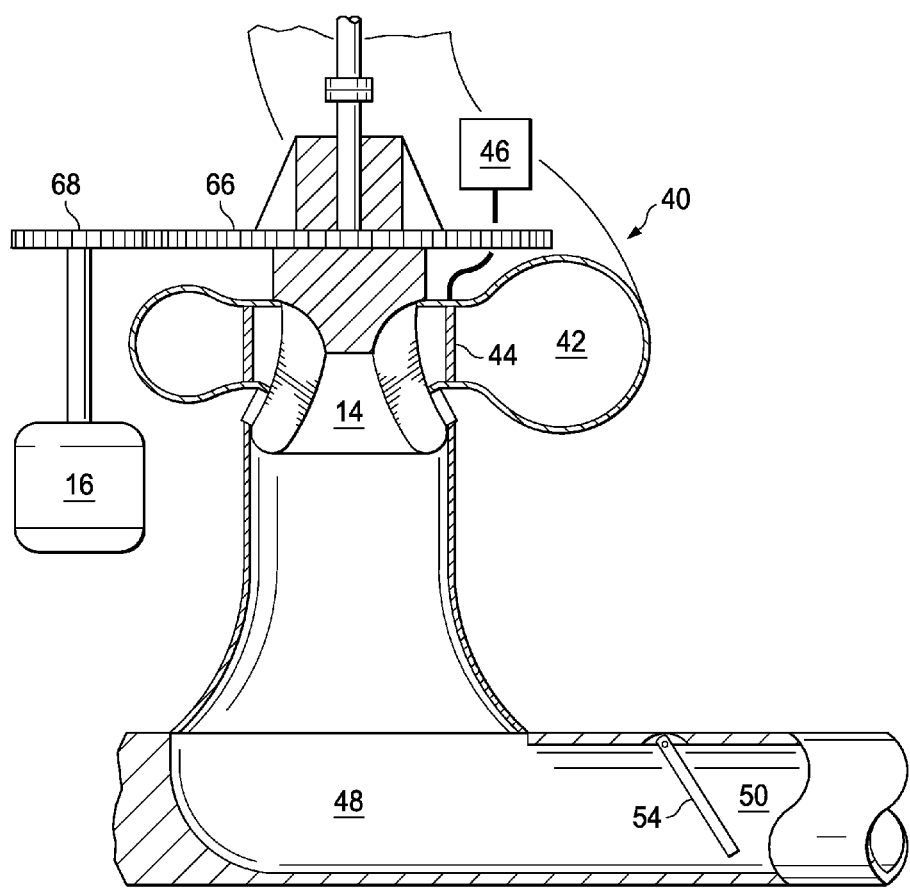

The inlet pipe 32 has an intake section 34 with a plurality of intake ports 34. Preferably, filters 38 prevent debris and marine life from being drawn into the intake ports 34 with the sea water 20. Referring also to FIG. 3, sea water 20 will pass from the intake section 34 to the turbine inlet section 40 which includes a swirl chamber 42 and flow control gates 44. The flow control gates 44 are also called wicket gates, and control the rate of flow of sea water 20 into the turbine 14. A gate controller 46 is provided for controlling the flow control gates 44, and thereby water flow through the turbine 14. The sea water 20 will pass from the turbine 44 into a discharge chamber 48, and then into a pressure reservoir 50. Two one-way valves, or check valves, 54 and 56 provide one way flow control valves for allowing flow only in one direction from the discharge chamber 48 into the pressure reservoir 50 and from the pressure reservoir 50 through the discharge pipe 58 and back into the sea, respectively. Preferably the first one-way valve 54 is provided by a flapper type valve with a valve element pulled into a closed position by gravity and/or hydraulic pressure. The second one-way valve 56 is preferably provided by a valve with a spring biased movable valve member which is urged into a sealing position by a bias spring. The moveable valve member may be provided by movable plates and/or balls which are moved into an open position by pressure applied to the pressure chamber 50 by the hydraulic pump 18.

The pressure reservoir 50, the one-way valve 54 and the one way valve 56 are included as part of the hydraulic pump 18. Preferably, as noted above, a plurality of hydraulic pumps 18 with associated power transfer sections 70, which include an associated float 72 and float tube 74 (see FIG. 4), are connected to the discharge chamber 48 for the turbine 14. The separate pressure reservoirs 50 will be connected to the discharge chamber 48, with respective one-way valves 54 disposed there-between for controlling flow from the discharge chamber 48 into respective ones of the pressure reservoirs 50. (See FIG. 4). In other embodiments, a singular hydraulic pump 18 which be utilized having a pressure reservoir 50 which is significantly larger in combination with a larger turbine discharge chamber 48 to expel water from the reservoir 50 at a rate faster than the flow rate through the turbine 14. In this way, the discharge chamber 48 will provide an accumulator for providing a constant flow through the turbine 14. A gas, such as air, may also be provided in a ullage of the discharge chamber 48, or in a connected volume, to assist with the accumulator function of discharge chamber 48 in maintaining a relatively constant pressure within the discharge chamber 48, and thus a constant flow of the sea water 20 through the turbine 14.

The discharge pipe 58 has a discharge section 60 with a plurality of discharge ports 62 which discharge sea water 20 from the SEEP 12 at a plurality of dispersed positions to minimize the effect on the local marine environment which may be caused by heating of the sea water 20 in passing through the turbine 14. The discharge pipe 58 distributes sea water 20 from the turbine 14 across a large area of the seabed by providing the plurality discharge ports 62 to reduce the temperatures of the sea water 20 located around the discharge pipe 58 by mixing the discharge with cooler water. The water 20 from the turbine 14 is distributed at various intervals to allow the warmer water from the turbine to be mixed with the cooler water at a lower depth.

The SEEP 12 includes a power transfer section 70 which converts the energy from the rising and falling of waves 22 into linear energy of a moving connecting rod 78 and to power the hydraulic pump 18. The power transfer section has a float 72 which is configured for floating on the surface of 24 of the sea and moving upwards and downwards with the waves 22. The float 72 is contained within a float tube 74 which is suspended by supports (not shown) in a fixed position to provide a guide way in which the float 72 is contained as it moves upwards and downwards with the waves to translate wave motion into linear motion to drive the connecting rod 78. The float tube 74 has float tube ports 76 for passing into the float tube 74 the sea water 20 as it rises and falls with the energy of the waves 22. The connecting rod 78 connects between the float 72 and an upper piston 86 of the hydraulic pump 18.

The hydraulic pump 18, as used herein, includes a hydraulic pump chamber 82, the pressure reservoir 50, the one-way valve 54 and the one way valve 56. The hydraulic pump chamber 82 has an upper cylinder section 84 and a lower cylinder section 90, which are in fluid communication by means of a connecting section 88. The upper piston 86 is moveably located in the upper cylinder section 84. A lower piston 92 is preferably moveably located in the lower cylinder section 92. Preferably, the upper piston 86 and the lower piston 92 slidably move linearly relative to the upper and lower cylinder sections 84 and 90, but in other embodiments rotary movable pistons may be provided. Fluid tight seals need not be provided between the upper piston 86 and the upper cylinder section 84, and between the lower piston 92 and the lower cylinder section 90, but my be provided in some embodiments of the present invention for improved efficiency of the hydraulic pump 18. Preferably sea water 20 is used as the working fluid 94 for the hydraulic pump 18. For embodiments with fluid tight seals for the pistons 86 and 92, a different working fluid 94 other than the sea water 20 may be provided. The working fluid 94 preferably completely fills the space in the hydraulic pump chamber 82 extending between the upper piston 86 and the lower piston 92, such that movement of the upper piston 86 will cause movement of the lower piston in response thereto.

In operation, the float 72 will move upwards and downwards within the float tube 74 in response to movement of the waves 22 which moves the connecting rod 78 upwards and downwards. Movement of the connecting rod 78 moves the upper piston 86 upwards and downwards within the upper cylinder section 84 of the pump chamber 82. Movement of the upper piston 86 causes the lower piston 92 to move with the same volumetric displacement as that caused by movement of the upper piston 86. The relative cross-sectional areas of the strokes of the pistons 86 and 92 are sized to provide a stroke and displacement for the movement of the lower piston 92 to draw the sea water into the SEEP 12 and through the turbine 14, causing the turbine to rotate and power the electric generator 16. The cross-sectional area of the stroke of the lower piston 92 is preferably four times larger than the cross-sectional area of the stroke of the upper piston 86 to provide a stroke ratio of 1:4. When the action of the waves 22 pulls the upper piston 86 upwards, preferably the lower piston 92 will be pulled upwards to provide suction on the pressure reservoir 50 which draws water through the turbine 14, through the one-way valve 54 and into the pressure reservoir 50. When the action of the waves 22 pushes the upper piston 86 downward, the lower piston 92 will preferably be pushed downward to apply pressure on the pressure reservoir 50 which pushes the one-way valve 56 open and expels sea water 20 from the pressure reservoir 50, through the discharge pipe 58 and back into the sea.

The size difference of 1:4 of the cross-sectional area of the stroke of the upper piston 86 to the lower piston 92 provides a mechanical advantage in that the force applied to the upper piston 86 by the float 72 and the connecting rod 78 is multiplied by four when applied to the lower piston 92 by the working fluid 94 of the hydraulic pump. Alternating positive and negative pressure in pressure reservoir 50 to force the sea water 20 from turbine 14 back to the sea during the application of positive pressure from the lower piston 92 and negative pressure as the lower piston 92 rises upwards to draw the sea water 20 from the discharge chamber 48 into the pressure chamber 50. The one-way valve 54 opens to allow water from the discharge chamber 48 to enter the pressure reservoir 50 on the up-stroke of lower piston 92 and closes to form a pressure tight seal during the down-stroke of piston 92. The one-way valve 56 allows water to pass from the pressure reservoir 50 back to the sea during the down-stroke of piston 50, and closes during the up-stroke of lower piston 92 to prevent the sea water 20 from entering the pressure reservoir 50 through the discharge pipe 58.

Figure 2:
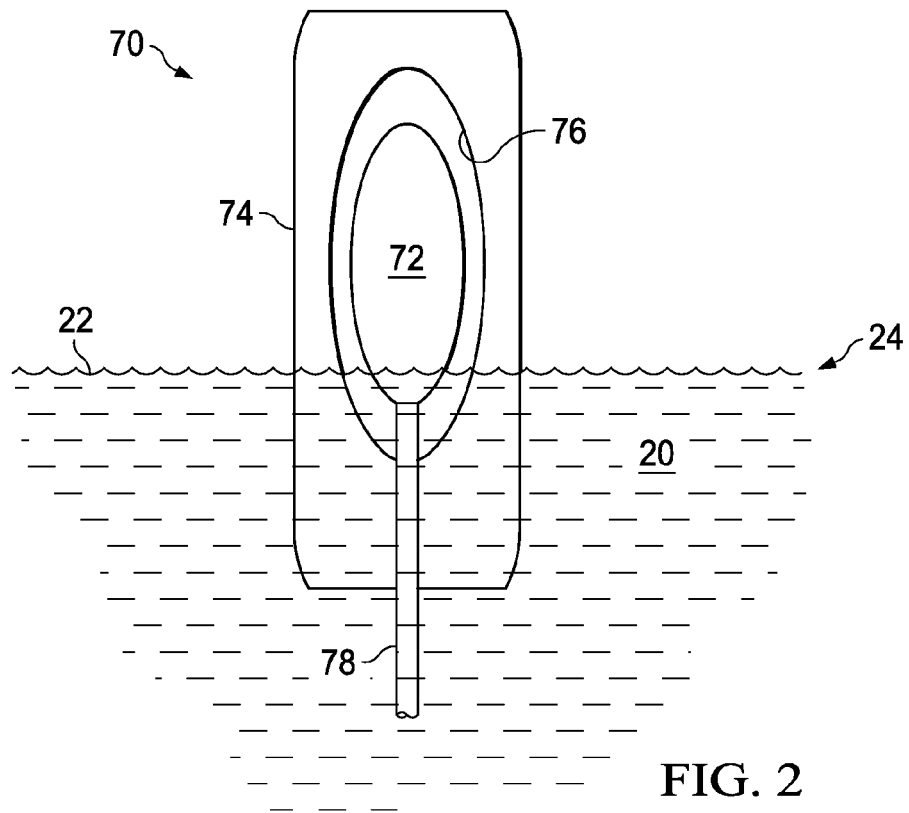

FIG. 2 is a schematic diagram depicting a side elevation view of the float 72 and the float tube 74 driving the hydraulic pump 18 of the SEEP unit 12. The hydraulic component of the SEEP unit 20 is critical to its efficient operation as the water from the turbine 14 must be voided to allow continuous operation. A key to the hydraulic system is the float tube 74 and float 72 shown in FIG. 2. The float tube 74 is preferably a hollow tube which contains elongated openings 76 on each side to allow water to enter the float tube 74. Housed within the float tube 74 is the float 72 which is suspended by the buoyant action of the water and is sized appropriately to move freely within the confines of the float tube 74 while remaining within the tube. The float 72 may be any size or weight as long as it is buoyant in the water consistent with Archimedes principle which states that an object will float as long as the pressure exerted against the bottom of the object exceeds the pressure exerted against the top of the object. In other words, buoyancy is directly proportional to the weight of the object per unit volume and the weight of water per unit volume that is displaced by the object. The float 72 will rise and fall within the float tube 74 in concert with the rise and fall of the crests and troughs of the incoming or outgoing waves 22. In this system, the overall buoyancy of the float 72 must consider the negative pressure pulling down on the float 22 from the pressure reservoir 50 as well as the actual weight of the float 72. While float 72 must remain buoyant, it also must be of sufficient weight to exert pressure against the upper piston head 86. A low surface area ratio of (1:4) for the cross-sectional area of the stroke of the upper piston head 86 to the cross-sectional area of the stroke of the lower piston head 92 facilitates these requirements.

Float 72 is connected directly to upper piston 86 by a connecting rod 78 which has a defined length to allow the float 72 to move freely within the float tube 74 for any anticipated size of a wave 22 and must, therefore, be site specific. The connecting rod 78 will pass through an opening at the base of float tube 74 to enter into the upper cylinder section 84 of the hydraulic pump chamber 82 and attach directly to the upper piston 86. The diameter of the piston 86 will be specified for a given system to provide sufficient driving force to vent the water from the pressure reservoir 50. A connecting section 88 of the hydraulic pump chamber 82 will feed pressure directly into a lower cylinder section 90 and to the lower piston 92. The lower piston 92 which will allow an equal amount of pressure per square inch to be distributed to the pressure reservoir 50 but over a larger area in concert with Pascal's law which states that a change in pressure of an incompressible fluid is exerted uniformly to every part of the fluid and to the surfaces of its container. Under this law, pressure exerted on the interior of the hydraulic pump chamber 82 by upper piston 86 is transmitted equally and uniformly to all interior surfaces of the hydraulic pump chamber 82. In concert with the Law of Conservation of Energy, the magnitude of the movement of the lower piston 92 is directly proportional to the ratio of the cross-sectional area of the stroke of the upper piston 86 to the cross-sectional area of the stroke of the lower piston 92. The lower end of hydraulic pump chamber 82 is formed to define a lower cylinder section 90 in which the lower piston 92 is disposed. Since the cross-sectional stroke area of lower piston 92 is four times larger than that of upper piston 86, the pressure exerted against the lower piston 86 by the floatation of float 72 is distributed over a larger area thereby allowing equal pressure spread over a larger surface area to provide a greater force.

FIG. 3 is a schematic diagram depicting a side elevation view of the water turbine 14 and the electric generator 16 of the SEEP unit 12. Preferably a Francis reaction turbine is used for the turbine 14. The turbine 14 directs a flow of water from the water inlet pipe 32 to transform the linear motion of the water to a rotatory motion to drive the electrical generator 16. To accomplish this transformation, the water entering the reaction turbine 12 passes through the flow control gates 44, or wicket gate, which direct the water downward into the turbine 14 to impact turbine blades and induce rotation of a runner for the turbine 14. The turbine 14 is connected to a shaft of the electric generator 16 by means of a primary gear 66 and a secondary gear 68 which connect to the drive shafts of the turbine 14 and the electric generator 16, respectively. Preferably the primary gear 66 and secondary gear 68 together have a gear ratio of at least 1:3 so that one rotation of the primary gear 66 results in three rotations of the secondary gear 32. The actual ratio to produce a specified level of electrical power for a specific site may be adjusted for maximum efficiency.

The SEEP unit 12 allows for standardized calculation and design of the reaction turbine 14 so that the turbine 14 can be mass produced from a single set of specification sheets thereby reducing engineering costs, manufacturing time and expense. The reservoir 50 calculations can be pre-determined for a given reaction turbine 14 and can be produced as needed from a given set of specifications. Once the required amount of electrical capacity is stated, a reaction turbine 14 can be built to the standardized specifications. As the SEEP unit 12 uses water flow at a low pressure head, a gear system increases the speed of rotation of the rotors thereby allowing more efficient operation at the lower pressure head and at low flow rates. In addition, multiple turbines 14 can be ganged together to meet the needs of a specific site as the volume of water in the ocean insures a constant supply of water to operate multiple turbines. In addition, the water is returned directly to the sea rather than being sent downstream as in a conventional hydroelectric plant. The depth of any given system can be adjusted to accommodate individual site factors as long as there is sufficient depth to create suitable pressure head for continuous flow. The design and construction of the reaction turbine 14 for any given power level can be completed and replicated thereby allowing the mass production of the turbines 14 as the variables are relatively constant. The flow rate and installation criteria can be specified for a standardized SEEP unit 12.

Pressure head is the energy in the water as a function of the height of the water in feet. There are several aspects of pressure head to be considered. The flow of water traveling down the water inlet pipe 32 will accelerate via gravity. The motion of water flowing through the SEEP unit 12 defines the velocity head or the kinetic energy per unit weight due to its motion. The water intake 34 is located below sea level 24 and any projected lowering of the sea level 24 due to tidal fluctuations to insure a constant flow of water to the turbine 14 for continuous operation. While the flow of the water, turbulence and friction losses (head loss) will be dependent upon the material and roughness of the interior of the inlet pipe 32, the position head of the water is the potential energy per unit weight of the mass of the water due to the height of the water column located above the turbine. The pressure head of the water is the potential energy per unit weight of the water due to the pressure exerted from above the turbine. Both position head and velocity head should remain relatively constant in this system as water will be continually refilling the inlet pipe 32. The flow of water through the turbine 14 will be dependent upon the relationship between the floor of the maintenance area 28, the vertical projection of the turbine 14, and the number of feet below sea level 24 at which the water intake section 34 is placed. The floor of the maintenance area 28 can be built to any depth; however, site variables and power needs will determine the actual depth. The turbine 14 will be secured to the floor of the maintenance area 28. The water inlet pipe 32 will preferably extend to be disposed upward from the turbine 14 to locate the intake section 34 above the turbine 14. The actual pressure created by the flow of water through the water inlet pipe is directly proportional to the length of the water inlet pipe. Reaction turbines are commonly built to accommodate low pressure heads and low flow rates in hydroelectric plants. In this system, a plurality of turbines may be ganged together to accommodate the power generation needs of a specific site as the water source is not restricted by the size of a lake or river flow.

As the water is drawn through the turbine 14 it will lose some of its velocity due to the frictional forces of the inlet pipe 32, the turbine flow control wicket gates 44, and the turbine 14. Regardless, gravity will force the water into the turbine inlet 40 where it will begin to accumulate until it reaches sufficient pressure to pass through the turbine 14, the discharge chamber 48, and to open the flapper valve 54 thereby venting the water into the pressure reservoir 50. The water pressure within the pressure reservoir 50 might stabilize with the pressure in the water reservoir 40. To avoid this problem the hydraulic pump 18 is driven by sea waves to alternately suck in more water from the water reservoir 40 and eject that water from the pressure reservoir 50 into the sea.

Figure 4:
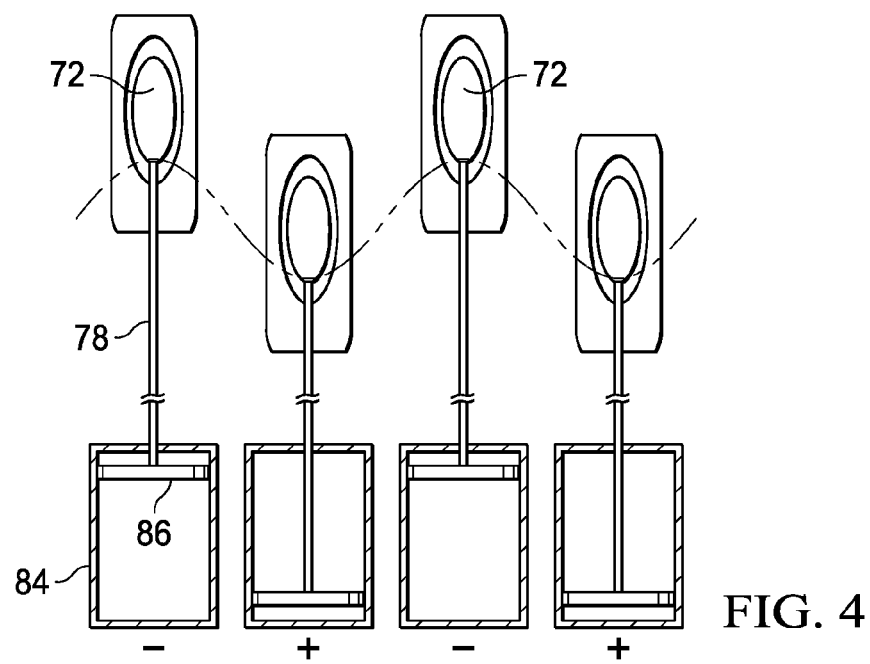

FIG. 4 is a schematic diagram depicting a side elevation view showing operation of four of the floats 72 in respective ones of the float tubes 74 acting together for drawing a constant flow of sea water 20 through the SEEP unit 12, as noted above in reference to FIG. 1. As one of the floats 72 rises with the crest of an incoming or outgoing wave, the respective piston heads 86 and 92 will be drawn upwards thereby creating a partial vacuum in respective ones of the pressure reservoirs 50. As one of the floats 72 passes through the crest and enters a trough, it is lowered thereby creating a positive pressure against piston heads 86 and 92 (see FIG. 4). This has the consequence of exerting positive pressure within the pressure reservoir 50. As this happens, the flapper valve 54 is forced closed and the one way valve 56 is forced open. This results in the water from the pressure reservoir 50 being ejected into the sea through the one-way valve 56. This process is repeated with each successive crest and trough of the incoming and outgoing waves. While the height of the incoming waves can be expected to vary, the hydraulic action of the SEEP unit 12 will continue to operate with both small and large waves. Any rise and fall of the waves will produce a change in pressure within the pressure reservoir 50. The ocean is rarely completely still as it is constantly reacting to a multiplicity of factors such as the wind and tidal factors. In addition, the maintenance wall/wave breaker at 26 will cause incoming waves to be reflected back toward the float 72. These reflected waves will cause additional wave action to maintain the rise and fall of float 72. Reflected waves can be in or out of phase with the incoming waves. When the reflected wave is in-phase, the energy from both waves is summed to increase the height of the overall wave. When the reflected wave is out-of-phase, the combined summed energy from both waves is reduced. In either case, the float 72 will continue to rise and fall. The inlet ports of respective ones of the pressure reservoirs 50 are connected to sequentially draw sea water 20 from within the discharge chamber 48 of the turbine 14 and provide a constant flow through the turbine, in conjunction with the turbine gate controller 46 and the flow control gates 44.

The hydraulic system 82 used in the SEEP 12 is designed to overcome the water pressure levels in the ambient sea at lower depths. The exiting water will be vented considerably below the level at which it entered the system and will lose some of its pressure due to resistance within the system. Accordingly, the pressure exerted by the hydraulic system 82 must exceed the higher ambient sea pressure at the ejection point in order to force the water back into the sea. Pressures below sea level increases with every 33.0 feet below sea level. For example, if the water from the water outlet pipe 58 is to mix with the water at 66.0 feet below sea level the water must be pressurized to more than 3.0 atmospheres (sea level atmospheric pressure+ 2.0 additional atmospheres, or a total of 44.1 psi). The hydraulic system 18 of the SEEP 12 provides more than enough pressure increase to force the water from the pressure reservoir 50 through water orifices 62 in the discharge section 60 and back into the sea.

The present invention provides several advantages over conventional power generation systems. The SEEP unit does not pose a threat to marine life. The SEEP unit has few moving parts accessible to marine life. The marine filter is designed to prevent fish, other sea life, and sea borne debris from entering the water inlet pipe. Since the water inlet will be below sea level, there is less risk of floatable debris entering the inlet pipe; however, below sea level currents may deposit debris at inlet pipe. Water velocities of 0.5 feet per second or less are needed to prevent small fish and jellyfish from being sucked into ocean power plants. This device may be a suitable marine filter for the SEEP unit. Although there is some risk of increasing the temperature of the water as it passes through the reaction turbine, the water will be mixed with cooler waters lower in the sea than where they originated. The SEEP unit does not pose a threat to passing vessels. The SEEP unit will be built near shore so it will be necessary to mark the floatation tubes to prevent boaters and swimmers from approaching. The SEEP system should be immune from tide levels as the entrance to the water inlet will be below the surface of the waves and can be placed sufficiently below projected low tidal levels. The seep will not pose a threat to the aesthetics of the shoreline on which it is located. The majority of the SEEP system is located below sea level; hence, there will be little to be seen in the water. The upper end of the floatation tube 1 can be designed to improve aesthetics. The maintenance area and reaction turbine may all be placed underground and covered with local soil or habitat so it may be difficult for the untrained eye to know that electricity is being created below ground. The entrance to the maintenance area is to be designed to be water proof in the event that a major storm results in flooding of the shore line near the device. The environmental impact of the SEEP is minimal. The SEEP system requires no fossil, petroleum, nuclear fuels, or wind turbines. After installation and a suitable period for environmental stabilization, the environmental impact should be minimal. Since the turbine blades will be rotating at a relatively slow speed due to the low head flow, noise levels may be minimized and contained within the maintenance area. The constant flow of water in a properly designed turbine with sufficient pressure head should minimize cavitation noises. The rotors and gears for the turbine 14 and the pump 16 will be in the maintenance area and therefore controlled more easily, if needed, with acoustical shielding within the maintenance area. The rise and fall of the float should not pose any major environmental concern as the float will be housed in the float tube. A surrounding mesh guard over the opening in the float tube may be used to prevent fish, other marine life, and debris from entering the float tube.

SEEP units may be provided in modular forms. In contrast to other hydroelectrical systems which must be designed individually for a given site, the SEEP units work with fixed gravitational, weight, and pressure levels which can all be stated a priori. Once the specifications for a SEEP unit are completed, the unit can be constructed and shipped directly to the site for installation. Site analysis and preparation, environmental impact assessments, and completing all governmental licensing or permits can be more easily accomplished as the system will have established performance documentation to smooth these processes. Different SEEP units may be designed for different electrical generating levels and prepared so that they can be pre-built for any installation which has suitable building criteria and a supply of water. The SEEP units are not limited to oceans, and may easily be used in any large body of water where there are sufficient waves to drive the float and enough water to insure an uninterrupted flow of water for the turbine, such as the Great Lakes of the USA or ship channels. Since the water passing through the turbine is returned to the source, the SEEP units can be used in areas where hydroelectric plants were not previously feasible due to an inability to provide a constant flow of water, the need for creating man-made lakes, and the depletion of those lakes for any reason.

Although the preferred embodiment has been described in detail, it should be understood that various changes, substitutions and alterations can be made therein without departing from the spirit and scope of the invention as defined by the appended claims.

What is claimed is:

1. A sea electricity energy production unit for passing a flow of water through a turbine to drive an electric generator, comprising:
    an intake section in fluid communication with a body of water and with a turbine inlet section for passing a flow of water from the body of water to said turbine inlet section;
    said turbine inlet section for receiving said flow of water from said intake section;
    a turbine connected to said inlet section for receiving said flow of water therefrom, and configured for discharging said flow of water to a discharge chamber, wherein said flow of water passing through said turbine powers said turbine to drive an electric generator;
    said electric generator connected to said turbine for generating electricity in response to being driven by said turbine;
    said discharge, chamber configured for receiving said flow of water from said turbine and passing said flow of water to a pressure reservoir;
    a first one-way valve disposed between said discharge chamber and said pressure reservoir for preventing a first flow from said pressure reservoir to said discharge chamber and passing said flow of water from said discharge chamber to said pressure reservoir;
    said pressure reservoir connecting between said discharge chamber and a discharge section for passing said flow of water from said discharge chamber to said discharge section;
    a second one-way valve disposed between said pressure reservoir and said discharge section for preventing a second flow from said discharge section to said pressure reservoir and passing said flow of water from said pressure reservoir to said discharge section;
    a hydraulic pump having a first section and a second section, said first section having a first piston moveable within said first section and said second section having a second piston moveable within said second section, said hydraulic pump having a hydraulic working fluid therein such that said second piston is moveable in response to movement of said first piston;
    a float disposed at a surface of a body of water and subject to waves occurring at said surface, said float moving upwards and downwards with the waves;
    a connecting rod connected on one end to said float and connected on another end to said first piston, such that upward movement of said float urges said second piston to move in a first direction, and downward movement of said float urges said second piston to move in a second direction; and
    wherein said hydraulic pump is connected to said pressure reservoir, such that said second piston is moveable in one of said first direction and said second direction to apply pressure to said pressure reservoir and push said flow of water through said second one-way valve and from said pressure reservoir, and said second piston is movable in the other of said first and second directions to draw down pressure on said pressure reservoir and pull said flow of water through said intake section, said turbine, said discharge chamber, through said first one-way valve and into said pressure reservoir.

2. The see electricity energy production unit according to claim 1, wherein said turbine is a Francis reactive turbine.

3. The see electricity energy production unit according to claim 1, wherein said second piston of said hydraulic pump is in direct fluid communication with said pressure reservoir.

4. The sea electricity energy production unit according to claim 1, wherein said turbine and said generator are located within a maintenance area inland of a shoreline.

5. The sea electricity energy production unit according to claim 1, wherein said body of water is salt water.

6. The sea electricity energy production unit according to claim 1, further comprising a float tube housing said float, and providing a guide tube for controlling linear movement of said float.

7. The sea electricity energy production unit according to claim 1, further comprising:
    a plurality of hydraulic pumps having pressure chambers connected to said discharge chamber by respective ones of a plurality of first one-way valves; and
    a plurality of floats and connecting rods connected to first pistons of respective ones of said hydraulic pumps; and
    wherein respective ones of said pressure chambers have second one-way valves for discharging respective portions of said flow of water there-from.

8. A sea electricity energy production unit for passing a flow of water through a turbine to drive the turbine, comprising:
    an intake section in fluid communication with a body of water and with a turbine inlet section for passing a flow of water from the body of water to said turbine inlet section;
    said turbine inlet section for receiving said flow of water from said intake section;
    a turbine connected to said inlet section for receiving said flow of water therefrom, and configured for discharging said flow of water to a discharge chamber, wherein said flow of water passing through said turbine powers said turbine to drive an electric generator;

said discharge chamber configured for receiving said flow of water from said turbine and passing said flow of water to a pressure reservoir;

a first one-way valve disposed between said discharge chamber and said pressure reservoir for preventing a first flow from said pressure reservoir to said discharge chamber and passing said flow of water from said discharge chamber to said pressure reservoir;

said pressure reservoir connecting between said discharge chamber and a discharge section for passing said flow of water from said discharge chamber to said discharge section;

a second one-way valve disposed between said discharge section to said pressure reservoir for preventing a second flow from said pressure reservoir to said discharge section and passing said flow of water from said pressure reservoir to said discharge section;

a hydraulic pump having a first section and a second section, said first section having a first piston moveable within said first section and said second section having a second piston moveable within said second section, said hydraulic pump having a hydraulic working fluid therein in fluid communication with said first and second sections, such that said second piston is moveable in response to movement of said first piston;

a float disposed at a surface of a body of water and subject to waves occurring at said surface, said float moving upwards and downwards with the waves;

a connecting rod connected on one end to said float and connected on another end to said first piston, such that upward movement of said float urges said second piston to move in a first direction, and downward movement of said float urges said second piston to move in a second direction; and wherein said hydraulic pump is connected to said pressure reservoir, such that said second piston is moveable in said second direction to apply pressure to said pressure reservoir and push said flow of water through said second one-way valve and from said pressure reservoir, and said second piston is movable in said first direction to draw down pressure on said pressure reservoir and pull said flow of water through said intake section, said turbine, said discharge chamber, through said first one-way valve and into said pressure reservoir.

9. The see electricity energy production unit according to claim 8, wherein said turbine is a Francis reactive turbine.

10. The see electricity energy production unit according to claim 8, wherein said second piston of said hydraulic pump is in direct fluid communication with said pressure reservoir.

11. The sea electricity energy production unit according to claim 8, wherein said turbine is connected to a generator to power said generator, and said turbine and said generator are located within a maintenance area inland of a shoreline.

12. The sea electricity energy production unit according to claim 8, wherein said body of water is salt water.

13. The sea electricity energy production unit according to claim 8, further comprising a float tube housing said float, and providing a guide tube for controlling linear movement of said float.

14. The sea electricity energy production unit according to claim 8, wherein said first valve comprises a flapper valve.

15. The sea electricity energy production unit according to claim 8, further comprising:

a plurality of hydraulic pumps having pressure chambers connected to said discharge chamber by respective ones of a plurality of first one-way valves; and a plurality of floats and connecting rods connected to first pistons of respective ones of said hydraulic pumps; and wherein respective ones of said pressure chambers have second one-way valves for discharging respective portions of said flow of water there-from.

16. A method for passing a flow of water through a turbine to drive an electric generator, comprising the steps of:

placing an intake section in fluid communication with both a body of water and a turbine inlet section;

connecting a turbine to the inlet section for receiving the flow of water therefrom and for discharging the flow of water to a discharge chamber;

connecting an electric generator to the turbine for generating electricity in response to the turbine driving the generator, connecting the discharge chamber to a pressure reservoir for passing the flow of water to the pressure reservoir;

preventing a first flow from the pressure reservoir to the discharge chamber and passing the flow of water from the discharge chamber to the pressure reservoir;

connecting the pressure reservoir to a discharge section for passing said flow of water from said discharge chamber, through said pressure reservoir, and to said discharge section;

preventing a second flow from the discharge section to the pressure reservoir and disposing a float at a surface of a body of water subject to waves occurring at the surface, such that the float moves upwards and downwards with the waves;

connecting the float to a first piston of hydraulic pump, such that movement of the float upwards and downwards moves the first piston into and out of a chamber of the hydraulic pump and results in urging the second piston to move in a first direction with upward movement of the float and in a second direction with downward movement the float;

passing the flow of water from said pressure reservoir to the discharge section; and connecting the hydraulic pump to the pressure reservoir, with a second section of the pump having a second piston which is moveable in a first direction to draw down pressure on the pressure reservoir and pull the flow of water through the intake section, the turbine, the discharge chamber, through the first one-way valve and into the pressure reservoir, and the second piston is moveable in a second direction to apply pressure to the pressure reservoir and push the flow of water through a second one-way valve and from the pressure reservoir to the discharge section.

17. The method according to claim 16, further comprising the steps of:

connecting a plurality of floats, connecting rods, hydraulic pumps, pressure chambers, and first one-way valves for connecting to the discharge chamber of the turbine; and drawing the flow of water through the turbine, the discharge chamber and the plurality of pressure chambers to maintain a substantially steady rate of flow for the flow of water.

18. The method according to claim 17, further comprising the step of providing the plurality of floats in spaced apart relation such that respective ones of the plurality of floats are rising while others ore lowering in response to waves.

19. The method according to claim 18, further comprising the step of disposing the turbine and the generator on the inland side of a shoreline.

* * * * *